US006474595B1

(12) United States Patent
Herman

(10) Patent No.: US 6,474,595 B1
(45) Date of Patent: Nov. 5, 2002

(54) ELECTRICAL ENERGY DEPLETION/ COLLECTION SYSTEM

(75) Inventor: Michael Herman, Aventura, FL (US)

(73) Assignee: Harnessing Energy/Storm Reduction, Inc., Palm Beach Gardens, FL (US)

( * ) Notice: Subject to any disclaimer, the term of this patent is extended or adjusted under 35 U.S.C. 154(b) by 0 days.

(21) Appl. No.: 09/495,603

(22) Filed: Feb. 1, 2000

(51) Int. Cl.[7] .................................................. B64B 1/06
(52) U.S. Cl. .......................... 244/30; 244/126; 244/1 A
(58) Field of Search ............................ 244/1 A, 33, 31, 244/30, 126; 239/14.1, 690.1; 174/2, 3; 361/117, 212, 218, 220

(56) References Cited

U.S. PATENT DOCUMENTS

| | | | | |
|---|---|---|---|---|
| 367,435 | A | * | 8/1887 | O'Brien |
| 1,275,710 | A | * | 8/1918 | Lewis |
| 1,553,087 | A | * | 9/1925 | Lehmann |
| 1,623,653 | A | * | 4/1927 | Baumeister et al. |
| 1,642,026 | A | * | 9/1927 | Hurttle |
| 1,757,111 | A | * | 5/1930 | Crossley |
| 3,127,135 | A | * | 3/1964 | Burr et al. |
| 4,335,093 | A | * | 6/1982 | Salomon |
| 4,792,806 | A | | 12/1988 | Bent et al. |
| 4,972,195 | A | | 11/1990 | Markson et al. |
| 5,331,330 | A | | 7/1994 | Susnjara |
| 5,367,245 | A | | 11/1994 | Mims |
| 5,392,218 | A | | 2/1995 | Emmerich |
| 5,396,220 | A | | 3/1995 | Markson et al. |
| 5,537,318 | A | | 7/1996 | Moses et al. |
| 5,610,813 | A | | 3/1997 | Greenewald et al. |
| 5,678,783 | A | | 10/1997 | Wong |
| 5,694,286 | A | | 12/1997 | Fowler et al. |
| 5,699,245 | A | | 12/1997 | Herold |
| 5,726,855 | A | | 3/1998 | Mourou et al. |
| 5,771,020 | A | | 6/1998 | Markson et al. |
| 5,912,396 | A | | 6/1999 | Wong |
| 5,947,581 | A | * | 9/1999 | Schrimmer et al. |

* cited by examiner

*Primary Examiner*—Charles T. Jordan
*Assistant Examiner*—T. Dinh
(74) *Attorney, Agent, or Firm*—Iandiorio & Teska

(57) ABSTRACT

An electrical energy depletion/collection system including a mobile airborne trigger platform; a mobile host platform; an electrical interconnection between the trigger platform and the host platform; and an electrical energy storage subsystem resident on at least one of the mobile airborne trigger platform and the mobile host platform.

2 Claims, 6 Drawing Sheets

ELECTRICAL ENERGY DEPLETION/ COLLECTION SYSTEM

FIELD OF INVENTION

This invention relates to an electrical energy depletion/ collection system sometimes also referred to as a system for harnessing lightning in which the use of one or more mobile airborne trigger platforms enables the user of the system to move into areas of storm activity and especially to continuously move in the jet stream. These areas are regions of instability caused by the jet stream infringing on the collision of air masses with an unstable polymorphic intersection seam.

BACKGROUND OF INVENTION

Prior art attempts at harnessing electrical energy from lightning or electrical charges produced in a storm have met with limited success.

For example, in U.S. Pat. No. 5,367,245, incorporated herein by this reference, the lightning attracting antenna structure is stationary and thus there is no way to move the antenna to an area where forecasts predict the formation of a storm.

Others skilled in the art have attempted to use deployable devices such as helicopters equipped with ionization equipment to prevent lightning strikes. See for example, U.S. Pat. No. 4,017,767. No means are disclosed, however, in this patent for harnessing the electrical energy produced by the lightning.

Balloons used to collect atmospheric electricity are known but since they are tethered to a fixed location, they cannot be deployed to areas where forecasts predict the formation of a storm. See, for example, U.S. Pat. Nos. 911,260 and 674,427 also incorporated herein by this reference.

Since various technologies exist to locate lightning and storms likely to produce lightning and electrical energy (see, e.g., U.S. Pat. Nos. 5,771,020; 5,699,245; 5,620,813; 5,537,318; 5,396,220; 5,331,330; 5,305,210; and 4,972,195, each of which is incorporated herein by this reference), a more efficient electrical energy depletion/ harnessing system would be mobile and able to follow or move to areas where storms are likely to produce lightning and electrical energy, such as where the jet stream impinges on an unstable atmospheric condition caused by collision of warm wet air with cold dry air.

BRIEF SUMMARY OF THE INVENTION

It is therefore an object of this invention to provide an electrical energy depletion/collection system.

It is a further object of this invention to provide such an electrical energy depletion/collection system which is able to navigate the jet stream.

It is a further object of this invention to provide such an electrical energy depletion/collection system which makes use of superconductive materials technology.

It is a further object of this invention to provide such an electrical energy depletion/collection system which is mobile and can follow, move to, and/or move into storms and/or areas where storms are likely to develop.

It is a further object of this invention to provide such an electrical energy depletion/collection system which is able to collect a storm's electrical energy and which also has the added effect of depleting a storm's energy thus weakening it and interfering with the formation of hurricanes, tornadoes, and the like, with the likely possibility of prevention.

It is a further object of this invention to provide such an electrical energy depletion/collection system which provides a commercially viable alternative method of providing electrical energy.

It is a further object of this invention to provide such an electrical energy depletion/collection system which can be employed with a number of different types of airborne trigger platforms and mobile host platforms including dirigibles, airships, helicopters, airplanes, trains, ships, tankers, and the like.

This invention results from the realization that a storm's electrical energy can be depleted and/or harnessed more efficiently if collection devices are designed such that they are capable of moving to the storm and thus an electrical energy depletion/collection system can now be fully realized by one or more mobile airborne trigger platforms (e.g., dirigibles) electrically tethered to mobile host platforms (e.g., ships, trains, or trucks) or other dirigibles.

This invention features an electrical energy depletion/ collection system comprising a mobile airborne trigger platform; a mobile host platform; an electrical interconnection between the trigger platform and the host platform; and an electrical energy storage subsystem resident on at least one of the mobile airborne trigger platform and the mobile host platform.

The mobile airborne trigger platform may be a dirigible which includes one or more antennas extending therefrom, frame members made of a superconductive material, and skin material made of a superconductive fabric. In one embodiment, the dirigible includes inner and outer skins separated by elastomeric devices to absorb shock forces.

The mobile host platform may be a ship, a submarine, or other type of vehicle or train or truck. In other embodiments, the mobile airborne trigger platform may be a rocket, kite, plane, or other airborne device.

The electrical interconnection typically includes a cable made of a superconductive material and the electrical energy storage subsystem may include a storage coil formed of a superconductive material. The storage coil may be located on the mobile airborne trigger platform and/or on the mobile host platform. In the preferred embodiment, the storage coil is integral with the structure of the mobile airborne trigger platform.

The preferred mobile airborne trigger platform includes at least one dirigible having one or more antennas extending therefrom and including frame members made of a superconductive material and skin material made of a superconductive fabric.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
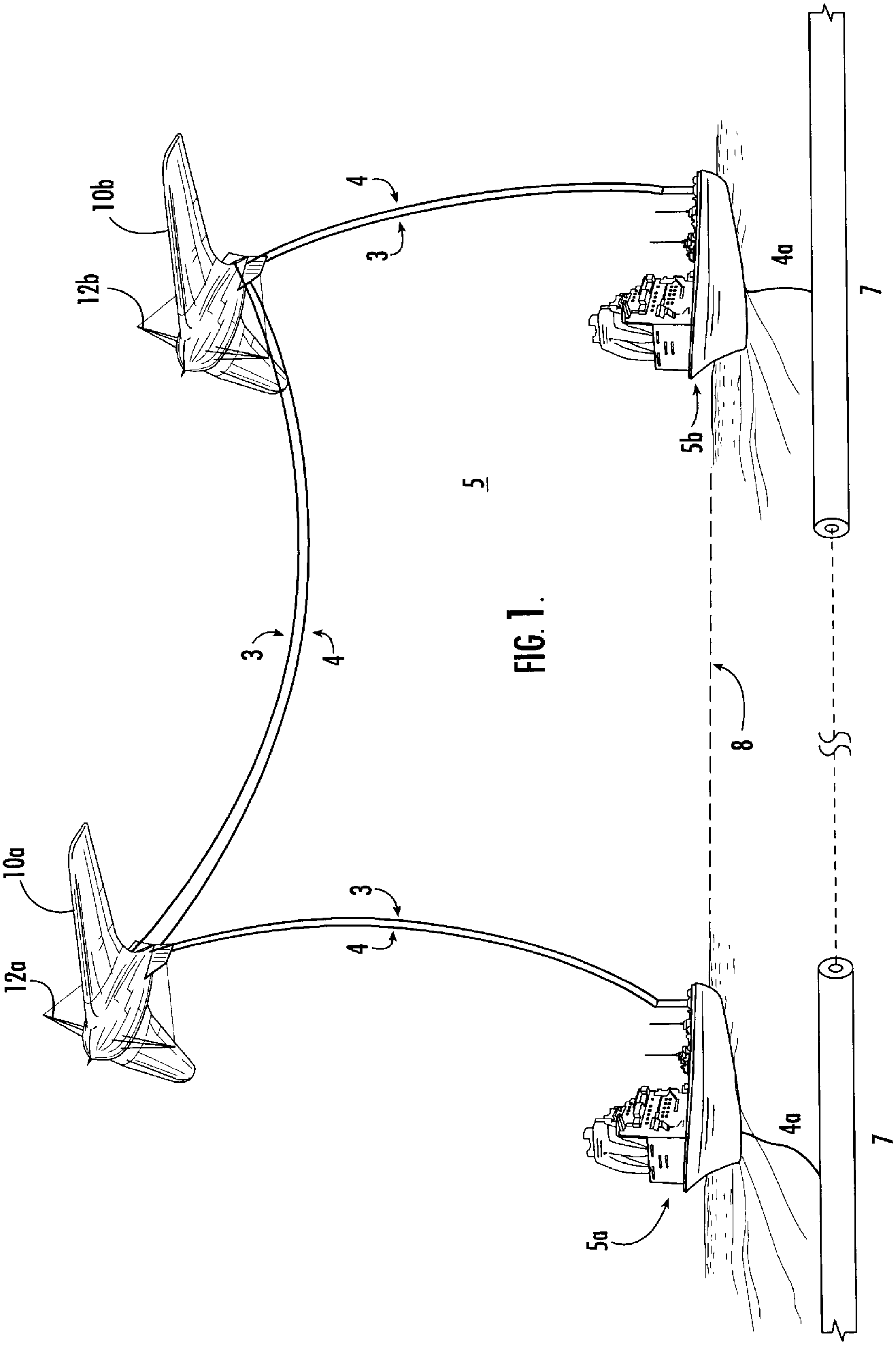
FIG. 1 is a schematic view of one embodiment of the electrical energy depletion/collection system of the subject invention.

In one embodiment, the electrical energy depletion/collection system 5, FIG. 1, of the subject invention includes mobile host platform or platforms 5*a* and 5*b*, in this embodiment, ships, but they could also be submarines, trains, tractor trailer trucks, or even airplanes.

Figure 2:
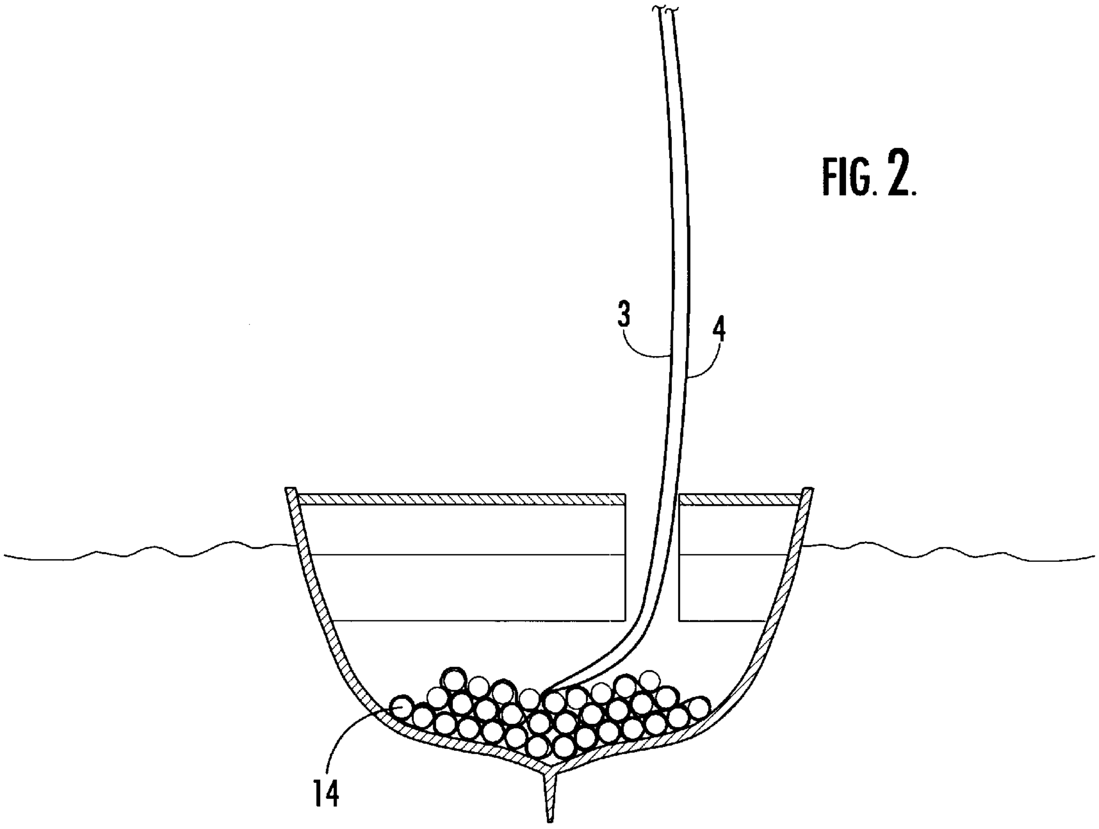
FIG. 2 is a schematic view of one type of electrical energy storage subsystem useful in the electrical energy depletion/ collection system of this invention.

System 5 also includes a mobile airborne trigger platform or platforms 10*a*, 10*b* which, in the preferred embodiment, are dirigibles but which could also be laser probes, rockets, kites, or the like. Such a dirigible may be elasteometrical and aerodynamic in design and constitutes a vessel with 2–3 times the volume of the Hindenberg but shaped like a flying wing capable of using jet or turboprop engines for propulsion and braking. There is typically an electrical and physical connection between mobile host platforms 5*a* and 5*b* and airborne trigger platforms 10*a* and 10*b* such as superconducting cables 3 and 4. System 5 also includes an electrical energy storage subsystem resident on at least one of the mobile airborne trigger platform and the mobile host platform. In one example, the electrical energy storage subsystem is a superconducting medium or coil or coils. For example, a portion of the skin of dirigibles 10*a* and 10*b* can be made of superconductive material electrically attached to antennas 12*a* and 12*b*, respectively. Alternatively, or in addition, ships 5*a* and 5*b* could include superconductive storage cables 14, FIG. 2 electrically connected to superconducting cables 3, 4 which are also attached to the skin of dirigibles 12*a*, 12*b*. One type of superconductive storage coil is disclosed in U.S. Pat. No. 5,367,245, hereby incorporated herein by this reference. Material suitable for use as high temperature superconductors are delineated by A. Bourdillon and N.X. Tan Bourdillon, "High Temperature Superconductors: Processing and Science", Academic Press, Inc. (1994).

In operation, when a forecast indicates the buildup of a storm center or possible weather conditions for a hurricane or tornado, ships 5*a*, 5*b* (or trains, tractor trailer trucks, submarines, etc.) are deployed to a specific region and, upon arrival, airborne trigger platforms 12*a*, 12*b* (there may be tens, hundreds, or even thousands of such platforms) are deployed. Antennas 12*a*, 12*b* collect the storm's charges which are then stored directly in dirigibles 10*a* and 10*b* and/or transferred to ships 5*a*, 5*b* for storage.

The result is the efficient collection of electrical energy which is both commercially useful and has the added effect of depleting the storm's electrical energy and thus weakening it and deforming the formation of hurricanes, tornadoes and the like.

Figure 3:
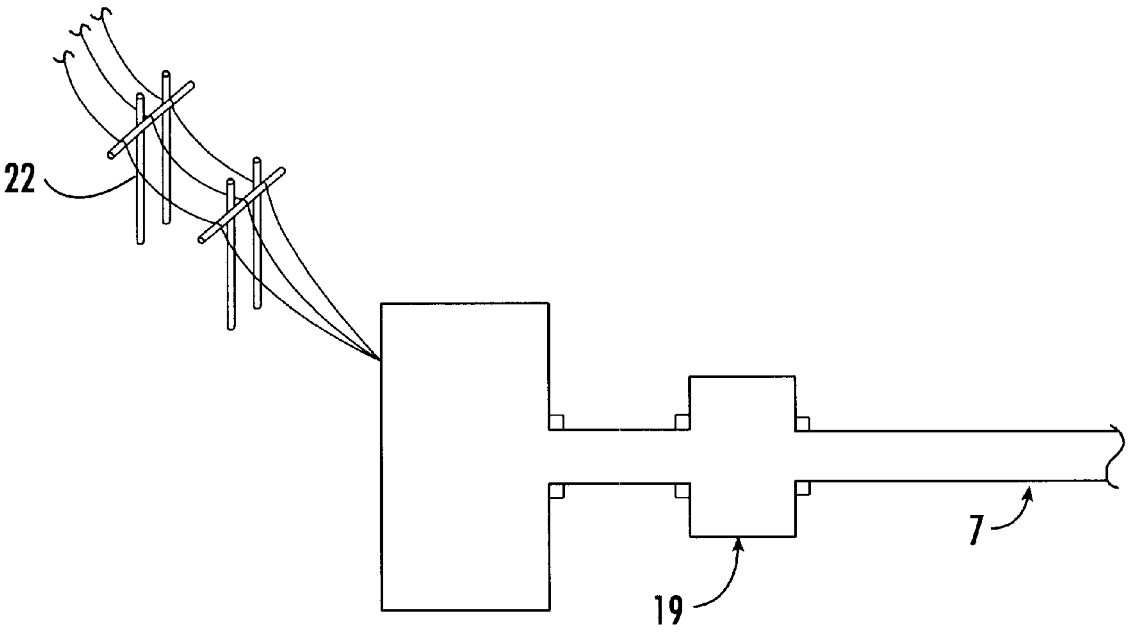
FIG. 3 is a schematic view of a land based distribution center useful in connection with the electrical energy depletion/collection system of the subject invention.

Host mobile platforms 5*a* and 5*b* are typically capable of unloading electrical energy from time to time via cables 4*a*, FIG. 1, to underwater cable 7 which is connected to land base distribution center 19, FIG. 3 connected to power lines 22.

Figure 4:
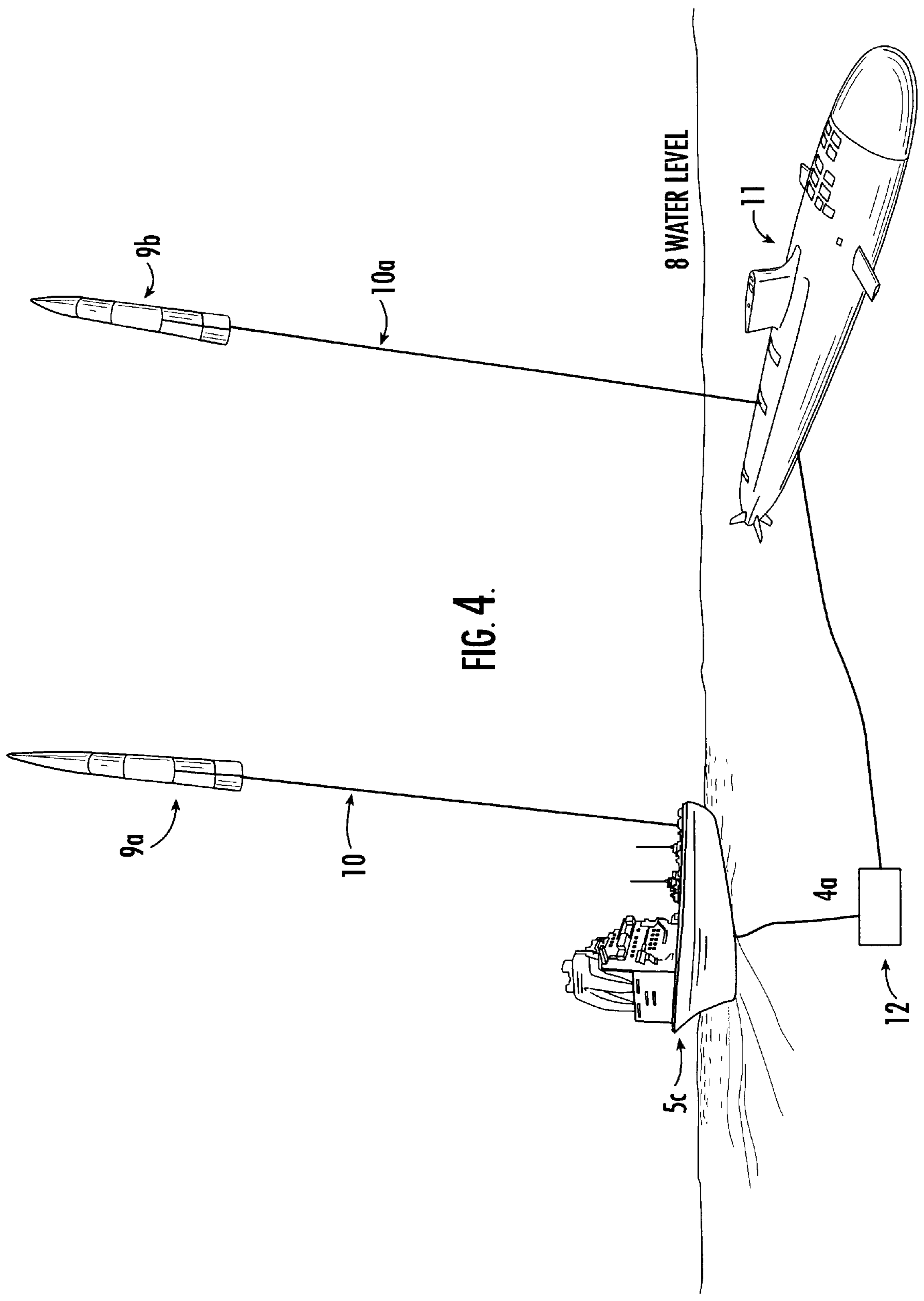
FIG. 4 is a schematic view of another embodiment of the electrical energy depletion/collection system of the subject invention.

In another embodiment, the mobile host platform or platforms comprise submarine 11, FIG. 4 and/or ship 5*c* which deploys rockets 9*a* and 9*b* which act as the mobile airborne trigger platforms. Cable 10 conducts electricity to host platforms 5*c* and 11 which include some kind of a superconductive storage facility or subsystem.

Figure 5:
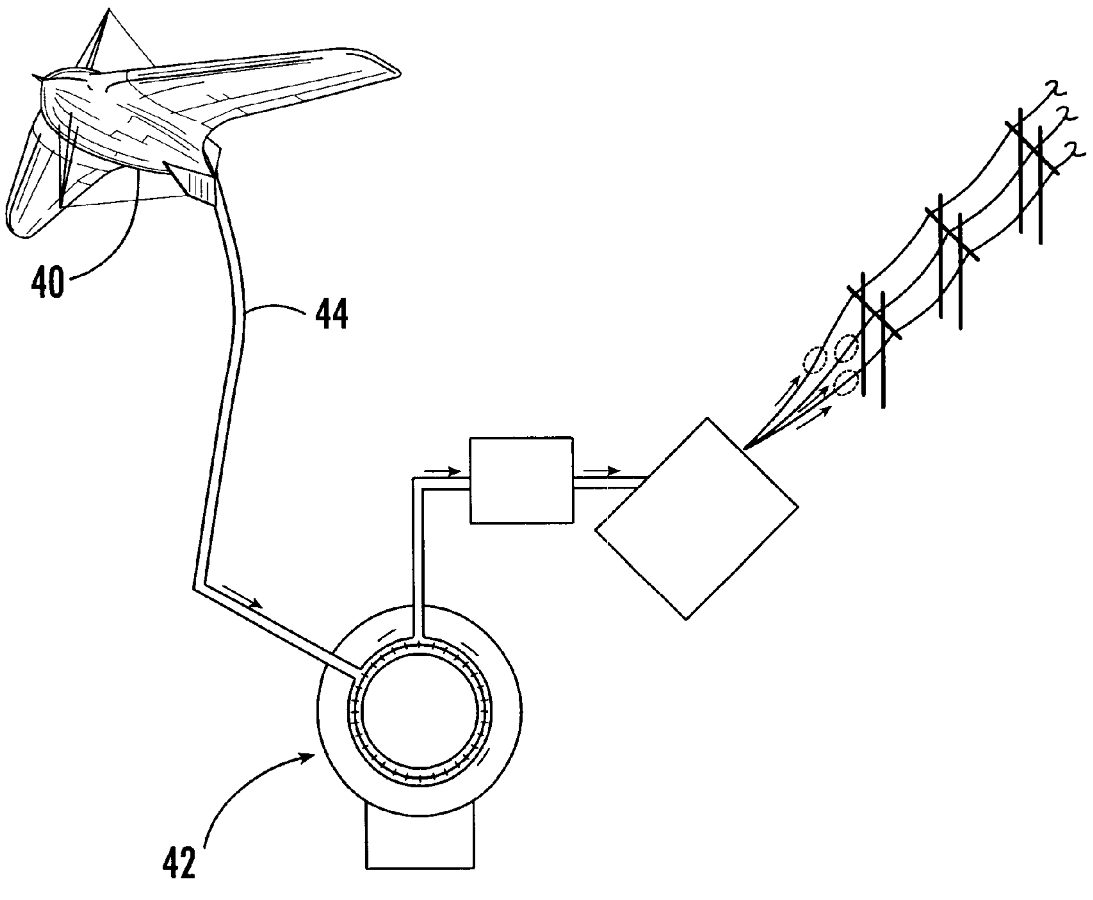
FIG. 5 is a schematic view of still another embodiment of the electrical energy depletion/collection system of the subject invention.

In still another embodiment, the superconductive storage system disclosed in U.S. Pat. No. 5,367,245 is modified to include airborne mobile trigger platform 40, FIG. 5 which is electrically connected to storage facility 42 by tether 44.

Figure 6:
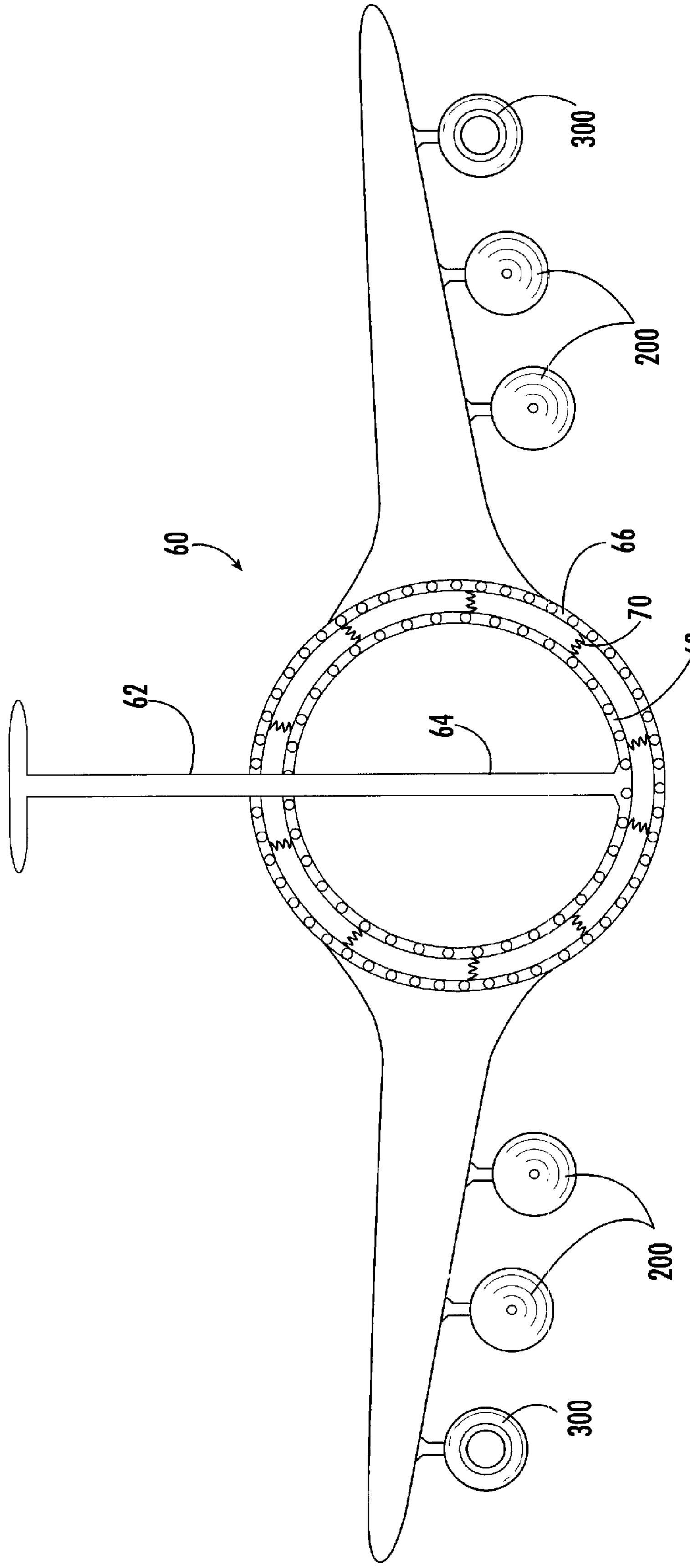
FIG. 6 is a schematic cross-sectional view of one type of mobile airborne trigger platform in accordance with the subject invention.
Figure 7:
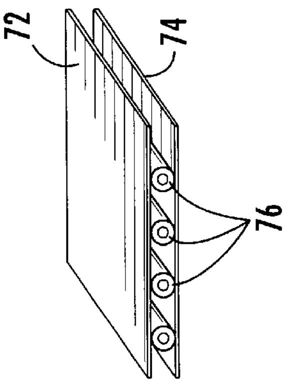
FIG. 7 is a schematic view showing the orientation of the cooling pipes disposed between the skin layers of the dirigible shown in FIG. 6 to provide a superconductive pathway for storing electrical energy in accordance with the subject invention.

In the preferred embodiment, the mobile airborne trigger platform is a specially configured dirigible 60, FIG. 6. Dirigible 60 includes one or more antennas 62 as shown and frame members 64 made of a superconductive material. Dual skins 66 and 68 are also preferably made of a superconductive fabric and are separated from each other by a small gap in which elastomeric devices such as springs 70 are disposed to absorb shock forces which impact dirigible 60. Each of the skins 66 and 68 include inner and outer layers 72 and 74, FIG. 7 surrounding piping 76 through which flows a cooling medium such as liquid helium. This arrangement forms a "storage coil" for electrical energy. The piping may be titanium in the preferred embodiment and in this configuration the pipes are connected to a cryogenic source (not shown) which renders the skin of dirigible 60 superconductive and able to act as an electrical energy storage subsystem such that in effect the whole dirigible is able to store electrical energy transferred to it when lightning strikes antenna 62. The combination of the dirigible skins and superstructure form an integral electrical storage electrical subsystem. Turbofan wind driven electrical generator 200 provides electrical power and engines 300 are driven by fuel such as liquid rocket propellant.

In this embodiment, dirigible 60, acting as a mobile airborne trigger platform in accordance with the subject invention, may navigate the jet stream freely and only transfer energy from time to time as needed to ships 5*a* and 5*b*, FIG. 1 by unrolling superconductive cables 3 and 4. In this way, dirigible 60 is able to navigate the jet stream and either collect electrical energy or travel to locations where storms are forecast to deplete the storm's electrical energy. Other mobile host platforms besides ships 5*a* and 5*b*, FIG. 1 which may be useful in connection with dirigible 60 include submarines, trains, and tractor trailer trucks.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. An electrical energy depletion collection system comprising:

- a mobile airborne trigger platform;
- a mobile host submarine;
- an electrical interconnection between the mobile airborne trigger platform and the mobile host submarine; and
- an electrical energy storage subsystem resident on at least one of the mobile airborne trigger platform and the mobile host submarine.

2. An electrical energy depletion/collection system comprising:

- a mobile airborne trigger platform including at least one dirigible having one or more antennas extending therefrom and including frame members made of a superconductive material and skin material made of a superconductive fabric;
- a mobile host platform; and
- an electrical interconnection between the mobile airborne trigger platform and the mobile host platform.

* * * * *